United States Patent Office 3,544,455
Patented Dec. 1, 1970

3,544,455
ITACONIC ACID PURIFICATION PROCESS
USING REVERSE OSMOSIS
Frank Adams, Jr., Groton, Leo F. Rice, Gales Ferry, and
Roy J. Taylor, Quaker Hill, Conn., assignors to Chas.
Pfizer & Co., Inc., New York, N.Y., a corporation of
Delaware
No Drawing. Filed June 16, 1969, Ser. No. 833,724
Int. Cl. B01d 13/00
U.S. Cl. 210—23                                  9 Claims

ABSTRACT OF THE DISCLOSURE

Process for purifying aqueous solutions of itaconic acid containing impurities by use of reverse osmosis, with the solution under pressure and exposed to one face of a semi-permeable membrane. The semi-permeable membrane allows passage of substantial amounts of itaconic acid and water, and prevents passage of substantial amounts of inorganic salts, colored matter and organic impurities, thereby accomplishing separation. The itaconic acid can then be recovered in relatively pure form by simple crystallization techniques.

BACKGROUND OF THE INVENTION

This invention relates to a process for purifying aqueous itaconic acid solutions utilizing the technique of reverse osmosis, whereby the solution is put under pressure and exposed to one face of a semi-permeable membrane which allows passage of substantial amounts of itaconic acid and water, but retains substantial amounts of inorganic salts, colored matter and organic impurities.

Itaconic acid is a valuable substance which has broad utility in the polymer field and in other areas. It is commonly produced by fermentation of carbohydrates such as glucose and cane and beet molasses, resulting in an impure fermentation broth containing the desired itaconic acid. For use in many processes it is often necessary and desirable to obtain the acid in relatively pure crystalline form.

The need for itaconic acid in relatively pure form has created a need for concentration and purification procedures to produce these forms. Typical prior art procedures have involved concentration cooling and crystallization of filtered fermentation broths. Procedures such as these have not been entirely satisfactory due to the fact that the itaconic acid crystals obtained from these impure solutions contain adsorbed or occluded impurities not readily removed by simple washing procedures, thus necessitating a recrystallization. Moreover, the accumulation of impurities in the crude mother liquor prevents obtaining a high recovery yield of itaconic acid.

The reverse osmosis processes of this invention provide a means for removing the inorganic salts, colored matter, and organic impurities from itaconic acid solutions, with substantial completeness, so that substantially pure itaconic acid may be obtained in one crystallization. Furthermore, the processes of this invention are more advantageously applicable to the overall continuous processing schemes which are needed for the economical production of itaconic acid by fermentation.

SUMMARY OF THE INVENTION

This invention provides a process for purifying aqueous solutions of itaconic acid containing impurities by use of reverse osmosis. With the solution under sufficient pressure and exposed to one face of a semi-permeable membrane, substantial amounts of itaconic acid and water pass through the membrane while inorganic salts, colored matter, and organic impurities are retained by said membrane, thereby effecting separation. The separation is so effective that the itaconic acid can be recovered in substantially pure form from the aqueous itaconic acid solution permeate by simple crystallization techniques.

The membrane, which will allow passage of the substantial amounts of itaconic acid and water but will prevent substantial passage through it of inorganic salts, colored matter, and organic impurities, is preferably of the type composed of cellulose acetate or the type composed of a water-permeable polyamide. Another preferred characteristic of the membrane is that it be water-permeable and have sodium-sulfate retaining properties.

Preferred operating pressures range from 100 to 1000 p.s.i.g. for the cellulose acetate and polyamide type membranes.

Preferred operating pH levels range from 2 to 4 for the cellulose acetate and polyamide type membranes. Most preferred are pH levels between 2 and 3 for the membranes to be used in this invention.

DETAILED DESCRIPTION OF THE INVENTION

This invention relates to a procedure for purifying impure aqueous itaconic acid solutions by removing impurities with the use of a reverse osmosis process. The reverse osmosis process accomplishes the separation by use of a semi-permeable membrane which surprisingly allows the passage through it of the itaconic acid and water while preventing the passage of inorganic salts, colored matter, and organic impurities. The flow of the itaconic acid and water is caused by the application of pressure to the original aqueous itaconic acid solution containing impurities in contact with the membrane face. The itaconic acid can then be recovered in purified form by evaporation of excess water from the process permeate solution and simple crystallization techniques known to anyone skilled in the art.

Reverse osmosis, as used here, refers to a process wherein water, or a solvent, is caused to flow from a solution, through a semi-permeable membrane, by the application of pressure. The flow of solvent is accompanied by a flow of a part, but not all, of the substances dissolved in it. As used here, the term reverse osmosis in intended to include those processes referred to as "ultrafiltration." The term reverse osmosis is not, in general or as used here, limited to water as a solvent but also includes other solvents. The reverse osmosis process is also to be distinguished from dialysis where a dissolved substance diffuses through a semi-permeable membrane under the influence or driving force of a concentration gradient only.

The original aqueous itaconic acid solution containing inorganic salts (e.g., sodium sulfate), colored matter, and organic impurities (e.g., sugars and unfermented carbohydrates), and which usually is the fermentation broth in which the itaconic acid was originally produced, is exposed to one face of the semi-permeable membrane under an externally applied hydraulic pressure. Consequently, a pressure difference exists across the thickness of the membrane. For the case of "porous-type" membranes, this pressure would be expected to cause water, or another solvent of low molecular weight to flow through the membrane and retain substances of relatively high molecular weight. Also, it would be expected that this pressure would cause passage through this porous-type membrane of inorganic salts having a relatively low molecular weight and would not cause passage of organic compounds having similar molecular weights. Thus for example, low flow rates and poor selectivity have been encountered for such organic acids as gluconic and citric for the process conditions similar to those used for purification of itaconic acid. Applying reverse osmosis to purification of a crude itaconic acid fermentation broth using a "porous-type" membrane leads to the surprising result that substantial amounts of itaconic acid pass through the membrane rather than being retained, and that inorganic salts (e.g., sodium sulfate) are retained by the membrane rather than passing through. Even more surprising is the fact that by using "less porous-type" membranes the selectivity of the separation is increased and more of the inorganic salts, organic impurities, and colored matter are retained by the membrane, while substantial amounts of the desired itaconic acid and water pass through the membrane.

The concentration of impurities in the aqueous itaconic acid permeate which flows through the membrane depends, generally, on the nature of the membrane, the concentration of the initial solution, the solution pH level, and the pressure employed. It should be noted that higher operating temperatures generally result in higher transfer rates of both water and itaconic acid through the membrane so that there is little effect on the concentration of itaconic acid in the permeate.

The membranes which are useful in the practice of this invention are those which are water-permeable and have sodium sulfate retaining properties. Preferred are those of the medium flow porous cellulose acetate type frequently referred to in the literature dealing with reverse osmosis as "Loeb-type membranes" and may be produced by methods well known to those skilled in the art of reverse osmosis membrane preparation.

For example, the methods of Loeb et al. described in U.S. Pats. 3,133,132 and 3,133,137 and those of Manjikian (Report No. 65–13, Department of Engineering, University of California, Los Angeles, March 1965 and Ind. Eng. Chem., Product Research and Development, 6, No. 1, 23–32 (1967) may be used with the appropriate modifications to render the resulting membrane permeable to common univalent salts such as sodium chloride. It is well known to those skilled in the art of reverse osmosis that the degree of salt-retaining character of membranes prepared by the cited methods is closely related to the temperature employed in the final annealing step, which comprises immersing the membrane in water at a specified temperature for a period of time. Thus, for example, Manjikian (Ind. Eng. Chem., Product Research and Development, 6, No. 1, 23–32 (1967)) has prepared membranes by (1) preparing a solution comprising 25% cellulose acetate (Eastman E–398–3), 45% acetone, and 30% formamide, (2) casting a film from this solution on plate glass at 23° C., (3) allowing part of the solvent to evaporate from the cast film for a period of 30 seconds at 23° C., (4) immersing the film in water at 0 to 3° C. for one hour, and (5) curing or annealing the resulting membrane by immersion in water at a specified temperature for five minutes. When the annealing temperature was varied, the resulting membranes showed various degrees of desalinizing ability, as shown by the test results in Table I (taken from Table 7 of the reference). These results were obtained in a laboratory test cell operated at 600 p.s.i.g. on a feed brine containing 5000 p.p.m. of sodium chloride.

TABLE I.—EFFECT OF CURING TEMPERATURE ON MEMBRANE PERFORMANCE

| Membrane | Curing temp., °C. | Desalinized water | |
|---|---|---|---|
| | | Flux, gal./sq. ft./day | Salt content, p.p.m. |
| A | (¹) | 95 | 3,800 |
| B | 70 | 45 | 800 |
| C | 76 | 30 | 250 |
| D | 78 | 17 | 110 |
| E | 81 | 12 | 85 |

¹ Unheated (23° C.).

It is well known to those skilled in the art of reverse osmosis and ultrafiltration that the "porosity" or permeability characteristics of cellulose acetate membranes are influenced by and can be controlled by variations in (1) degree of acetylation of the cellulose acetate, (2) the composition of the solvent, (3) the casting conditions, (4) temperature and time of post-treatment or annealing procedures A partial hydrolysis by treatment of the final membrane with alkaline solutions has also been employed as described in U.S. Pat. 3,290,286, Dec. 6, 1966. The various manufacturers of reverse osmosis equipment generally manufacture their own membranes and do not disclose their proprietary techniques, but it is believed that they employ modifications and combinations of the published procedures. Since the field of reverse osmosis and ultrafiltration is a rapidly developing one, with present markets largely in developmental areas, it is understandable that manufacturers do not presently offer a wide assortment of membranes with different flux and permeability characteristics. In choosing membranes for specific applications such as itaconic acid, it is therefore necessary for the customer or potential user to select from those available after consultations with manufacturers and to carry out a certain amount of trial-and-error evaluation study.

In the case of the itaconic acid application, it appears that the optimum membrane is one which is intermediate between those useful for desalting water and those which allow a high percentage of salts to pass through. Thus, in Table I, a membrane similar to "membrane B" might be suitable for the purposes of the present invention.

This invention is not restricted, however, to cellulose acetate membranes of the type described above. Various manufacturers prepare and offer for sale membranes of different desalinizing properties. The cellulose acetate membranes useful in this invention are those generally referred to as being of "intermediate or medium porosity." They are not characterized by pore diameter or by any other simple physical property but their solute retention and flow rate characteristics are similar to those of membranes produced by the methods described in the previously mentioned publications and these characteristics can be varied in similar fashion. Among the manufacturers who offer suitable membranes or who offer membranes which may be adapted, as indicated above, for use in this invention are Havens Industries, San Diego, Calif.; Desalination Systems, Inc., Escondido, Calif.; Universal Water Corporation, Del Mar, Calif.; Aerojet-General Corporation, Azusa, Calif.; Gulf General Atomics, San Diego, Calif.; and American Standard Corporation, New Brunswick, N.J. It is thus a simple matter for one who wishes to practice this invention to select a suitable membrane from those available.

Membranes of the cellulose acetate type are only one of the membrane types which are preferable for use with our invention and the scope of this invention is not restricted to this type of membrane.

Another type of membrane which is preferred for use in our invention is a membrane of the water permeable polyamide-type produced by E. I. du Pont de Nemours and Company, Wilmington, Del., and known by the company's trade name as "Permasep" membranes.

Another type of membrane contemplated as useful in our invention when suitably adapted is a membrane of the polyelectrolyte complex type such as those produced by the Amicon Corporation, Lexington, Mass., containing polystyrene sulfonate anionic groups and polyvinylbenzyltrimethyl ammonium cationic groups, as described by A. S. Michaels in Ind. Eng. Chem. 57 (10), 32–40 (1965). These membranes are available under such trade names as Diaflo UM–1, Diaflo UM–2, Diaflo UM–3 and Diaflo XM–50.

Membranes may also be fabricated from other cellulose derivatives, from copolymers of mono- and dimethylacrylates of ethylene glycol with methyl methacrylate, and may be either cationic or anionic or non-ionic in character. Membranes composed of substituted nylons may also be used as can membranes composed of other film-forming cellulose esters.

It should be noted that at progressively lower concentrations of itaconic acid relative to the impurities in the original solution under an applied hydraulic pressure, more of the impurities tend to pass through the membrane in the permeate stream. Thus, it is desirable to employ recycle streams and multistage reverse osmosis units to attain maximum product separation and process efficiency.

The pH levels useful for this invention are from about 1.5 to 4. The preferred pH range is from about 2 to 4 where the membrane is cellulose acetate or a water-permeable polyamide. The most preferred pH range for use with the membranes of this invention to purify aqueous itaconic acid solutions is from about 2 to 3. At pH values below 2 the life of cellulose acetate type membranes is reduced due to hydrolysis of the membrane. This effect becomes progressively worse with more acidic solutions. At higher pH values (less acidic solutions) the percentage of itaconic acid in the original impure solution that passes through the membrane in the permeate stream begins to decrease such that the upper economic limit on pH level is about 4.

The hydraulic pressure which is applied to the original solution and transmitted to the retentate face of the membrane is selected with a view to many variables. As a general matter, the pressure used must exceed the difference between the osmotic pressure of the crude itaconic acid solution on the pressurized side of the membrane and the osmotic pressure of the relatively pure aqueous itaconic acid solution on the low pressure side of the membrane. Higher pressures will, generally, result in higher permeation rates of itaconic acid and solvents through the membrane up to a certain maximum depending on the membrane and are, consequently, desirable.

The magnitude of the lower pressure limit depends on many factors and especially on the nature of the membrane used. The lowest useful pressure may thus be a few pounds per square inch in the case of a very porous membrane of poor selectively or several hundred pounds per square inch for a relatively "slightly porous" membrane of high selectivity.

The upper limit on the pressure is set by the mechanical nature of the membrane and the membrane must be constructed or supported in a manner which will allow it to contain the hydraulic pressure which is applied to one of its faces. Typically, for use in this invention, a flat membrane may be supported by a porous backing plate or a membrane of annular cross-section may be supported by being deposited on the inner surface of a porous tube. Other support methods, such as self-supported membranes consisting of small-bore, relatively heavy walled tubes, such as hollow fibers, may, of course, also be used. The useful pressure is also limited by the fact that the membrane, itself, may be compressed against its own support at high pressures and may, consequently, lose some of its ability to pass low molecular weight compounds.

Those skilled in the art will be able to select appropriate operating pressures for use in performing this invention. The pressures used will depend on the degree of separation desired, the nature of the impurities, the type of membrane used, as well as upon other factors.

As a general matter, the pressures useful with this invention range from 10 to about 1500 p.s.i.g., the limit of the apparatus presently in use for desalination of brackish water. Higher pressures are also possible, the limitations being set by equipment limits. We prefer to use pressures of 100 to 1000 p.s.i.g. with the cellulose acetate and polyamide membranes which are included in an embodiment of our invention.

The following examples are provided by way of illustration and should not be interpreted as limiting the invention, many variations of which are possible without departing from the spirit or scope thereof.

EXAMPLE I

Diluted itaconic acid whole broth is put through a Havens Industries' reverse osmosis module containing 7 square feet of surface area of cellulose acetate membrane designated as type 3A1. This membrane corresponds to the "medium-porosity" Loeb-type membranes previously described. The broth is pumped through the module at a rate of 0.8 gal./min. at a pressure of 400 p.s.i.g. and at room temperature. The permeated solution is continuously removed from the system over a five-hour period at an average rate of 5.02 gal./day/ft.$^2$ membrane area. A comparison of the starting liquor, the feed liquor at the end of five hours, and the composite permeate stream is given below.

| | Starting liquor | Feed at end | Composite permeate |
|---|---|---|---|
| Hazen (color) | 3,500 | 12,500 | 55 |
| Ash (SO$_4$=), g./100 ml | 0.425 | 0.995 | 0.023 |
| pH | 1.80 | 1.75 | 2.00 |
| Tot. acid as itac., g./100 ml | 3.54 | 6.19 | 3.13 |
| Sulfates as H$_2$SO$_4$, g./100 ml | 0.382 | 0.993 | 0.0005 |
| Chlorides as Cl$^-$, g./100 ml | 0.026 | 0.076 | 0.013 |

Results show approximately 98% retention of colored bodies by membrane. A portion, approximately twenty liters, of the composite permeate liquor is then evaporated under vacuum to crystallize the itaconic acid in refined grade purity. A total weight of 455.7 g. of itaconic acid is recovered (represents a 74.4% yield) having the following assays.

Titre—100.6%
Ash (SO$_4$=)—0.010%
Bromination—100.4%
Sulfates—none
Chlorides (Cl$^-$)—20.5 p.p.m.
M.P.—164–165° C.
Hazen (5% soln.)—25; opt. den. at 430 m$\mu$ 0.025
Loss on drying—0.091%
Iron—Less than 2 p.p.m.
Ether insol.—0.05%

The composition of the mother liquor from the crystals is as follows:

Chlorides (Cl$^-$)—0.125 g./100 ml.
Itaconic acid—7.62 g./100 ml.
Ash (SO$_4$=)0.31 g./100 ml.; opt. den. at 430 m$\mu$ 0.322
Sulfate (as H$_2$SO$_4$)—0.05 g./100 ml.

Itaconic acid material balance shows 99.3% accountability. Similar results are obtained with this procedure using pressures between 100 and 1000 p.s.i.g.

EXAMPLE II

Decalcified itaconic acid broth is put through a Havens Industries' reverse osmosis module containing 7 square feet of surface area of cellulose acetate membrane designated as type 2A2 (corresponding to the "more porous" Loeb-type membrane previously described). The membrane is conditioned by running water through the modules overnight at the desired pressure prior to running the experiment. The broth is pumped through the module at room temperature and at a pressure of 400 p.s.i.g. during the first 4 hours and 610 p.s.i.g. during the last 2 hours. The permeated solution is continuously removed from the system over a six-hour period at an initial rate of 0.45 gal./hr./ft.$^2$ membrane area which decreases to a rate of about 0.34 gal./hr./ft.$^2$ membrane area after 4 hours and gradually decreases to a rate of 0.30 gal./hr./ft.$^2$ membrane area after 6 hours. During the experiment there is constant recirculation of feed liquor to the feed drum. A comparison of the starting liquor, the feed liquor at the end of six hours, and the composite permeate stream is given below.

| | Starting liquor | Feed at end | Composite permeate |
|---|---|---|---|
| Hazen (color) | 17,000 | 26,000 | 650 |
| Ash (SO$_4$=), g./100 ml | 0.90 | 0.80 | 0.35 |
| pH | 1.70 | 1.65 | 1.72 |
| Tot. acid as itac., g./100 ml | 8.85 | 9.53 | 6.46 |
| Sulfates as H$_2$SO$_4$, g./100 ml | 0.10 | 0.12 | 0.037 |

The itaconic acid is then recovered from a portion of the composite permeate by simple crystallization techniques. The acid product represents about a 65% yield but is not of refined grade purity.

EXAMPLE III

The procedure of Example II is followed except that the composite permeate obtained in Example II is pumped at 430 p.s.i.g. pressure through a Havens' cellulose acetate, reverse osmosis membrane designated as type 3A1. The itaconic acid recovered in crystallized form is of refined grade purity.

EXAMPLE IV

Itaconic acid whole broth is deacidified with lime to a pH of 3.18 and put through a Havens Industries' reverse osmosis module at 400 p.s.i.g. operating pressure, having a type 3A1 cellulose acetate membrane. The rate of permeation through the membrane is found to be after one hour 2.67 gal./day/ft.$^2$ of membrane area and at the end of the second hour it is 2.2 gal./day/ft.$^2$ of membrane area. A comparison of the starting liquor, the feed liquor at the end of two hours, and the composite permeate is given below.

|  | Starting liquor | Feed at end | Composite permeate |
|---|---|---|---|
| Tot. acid as itac., g./100 ml | 8.28 | 6.26 | 3.03 |
| Ash (SO$_4$=), g./100 ml | 2.07 | 2.69 | 0.08 |
| pH | 3.18 | 3.35 | 2.55 |

The ratio of the concentration of itaconic acid in the permeate to the itaconic concentration in the feed represents a yield of 43%. Somewhat lower yields of itaconic acid are obtained using this procedure with a feed solution having a pH level of 4.

EXAMPLE V

Decalcified itaconic acid broth is pumped through a four inch Du Pont Permasep® permeator containing approximately 5,000 square feet of nylon membrane surface area. Permeate liquor is continuously removed while the feed is recirculated to the feed drum. The liquor is pumped at a rate of 0.75 gal. per minute at a pressure of 800 p.s.i.g. and at room temperature; the initial permeate rate is 0.0047 gal./day/ft.$^2$ and the final permeate rate is 0.00077 gal./day/ft.$^2$. The test is conducted by filling a 55 gal. s/s drum with 405.5 lbs. of decalcified solution having an itaconic assay of approximately 10 g./100 ml. and then pumping the feed broth from the drum through the permeator, recirculating the feed liquor and continuously drawing off permeate liquor in five-gallon portions. When the feed liquor is reduced to 25% of the original weight, two five-gallon portions of water are added to the feed drum and two additional five-gallon samples of permeate are removed.

The last 5-gallon sample (before the addition of water to the feed tank) is selected for the recovery of crystalline itaconic acid. This portion of the permeate should have the highest ratio of impurities to itaconic acid of all the permeate cuts. A comparison of the feed liquor and the permeate liquor for this 5-gallon sample is given below.

|  | Feed liquor | Permeate liquor |
|---|---|---|
| Sulfates (as H$_2$SO$_4$), g./100 ml | 1.693 | 0.1781 |
| Ash (SO$_4$=), g./100 ml | 5.276 | 2.644 |
| pH | 2.7 | 2.8 |
| Opt. den. at 430 mμ (color) | 37.0 | 2.3 |
| Sp. grav | 1.180 | 1.069 |
| Acid titre (as itac.), g./100 ml | 12.46 | *13.51 |

*NOTE.—Higher acid concentration in permeate compared to feed is probably due to some evaporation.

The permeate liquor is carbon treated by passing the solution over a column of granular carbon. The introduction volume for the crystallization was 15,000 ml., having an itaconic content of 8.79 g./100 ml. Three crops of crystals are removed by simple crystallization techniques, representing an 87% recovery. The itaconic acid material balance accountability is 99%. A comparison of the three crystal crops is given below.

|  | 1st crop | 2nd crop | 3rd crop |
|---|---|---|---|
| Weight, g | 548 | 492 | 107 |
| Assay (titre) percent | 99.9 | 99.9 | 98.9 |
| Ash (SO$_4$=) | 0.035 | 0.056 | 0.48 |
| Sulfates (as H$_2$SO$_4$) | 42 p.p.m. | None | 0.11 g./100 ml. |
| Chlorides (as Cl-), p.p.m | 232 | 23 | 330 |
| Hazen (5% soln.) | <10 | <10 | -------- |
| M.P., °C | 162.8–163.1 | 163.2–163.8 | 159.2–161 |

Somewhat less pure permeate solutions are obtained using this procedure at a pH level of 4 and at a pressure level of 1000 p.s.i.g.

EXAMPLE VI

Filtered decalcified itaconic acid broth is pumped through a one-quarter inch Du Pont Permasep® permeator containing approximately 10 square feet of nylon membrane surface area. Permeate liquor is continuously removed while the feed is recirculated to the feed tank. The liquor is pumped at a pressure which is, at its highest level, 600 p.s.i.g. initially and at its lowest level is 430 p.s.i.g. The initial permeate rate is 0.20 ml./min. and the final permeate rate is 0.12 ml./min. The test is conducted by filling a 10-gallon polyethylene feed tank with 5 gallons of filtered decalcified itaconic acid broth which is pumped through the permeator, while permeate liquor is continuously drawn off and retentate liquor is continuously recirculated back to the feed tank at a rate varying generally between 5 to 15 ml./min. The first 10 ml. of permeate collected is discarded and the next 36 ml. of permeate is collected. A comparison of the feed liquor and the permeate liquor is given below.

|  | Feed liquor | Permeate liquor |
|---|---|---|
| Specific gravity | 1.07 | 1.02 |
| Opt. den. at 430 mμ (color) | 12.8 | 0.61 |
| Ash (SO$_4$=) g./100 ml | 1.37 | 0.11 |
| pH | 1.65 | 1.48 |
| Tot. acid as itac., g./100 ml | 12.94 | 12.25 |
| Sulfate, g./100 ml | 0.96 | 0.05 |
| Chlorides (Cl-), g./100 ml | 0.16 | 0.07 |

Similar results are obtained using this procedure at a pressure level of about 100 p.s.i.g.

EXAMPLE VII

The same procedure is used as in Example VI except that crude citric acid broth is substituted for the filtered decalcified itaconic acid broth and poor selectivity, except for color, is obtained. Similarly, poor results are obtained for crude gluconic acid broth.

What is claimed is:

1. A process for purifying an aqueous solution of itaconic acid containing impurities which comprises exposing said solution to one face of a semi-permeable membrane through which substantial amounts of itaconic acid and water pass, and substantial amounts of inorganic salts, colored matter, and organic impurities will not pass, said solution being under a pressure sufficient to cause the itaconic acid and water to flow from the solution through said membrane, whereby inorganic salts, colored matter, and organic impurities are retained by the membrane and the itaconic acid is not.

2. The process of claim 1 wherein said membrane comprises a water-permeable polyamide.

3. The process of claim 2 wherein the pressure is from about 100 to 1,000 pounds per square inch and the pH level is from about 2 to 4.

4. The process of claim 1 wherein said membrane comprises a cellulose ester.

5. The process of claim 4 wherein the pH level is from about 2 to 4 and the pressure is from about 100 to 1,000 pounds per square inch.

6. The process of claim 1 wherein said membrane is a water-permeable membrane with sodium sulfate retaining properties.

7. The process of claim 1 wherein the pH level is from about 2.0 to 3.0.

8. The process of claim 1 wherein the water from said solution permeated through said membrane is evaporated and the itaconic acid crystallized therefrom in purified form.

9. The process of claim 1 wherein the aqueous solution of itaconic acid containing impurities is a fermentation broth.

References Cited

UNITED STATES PATENTS

| 3,244,620 | 4/1966 | Hansen et al. | 210—22 |
| 3,272,737 | 9/1966 | Hansen et al. | 210—22 |

REUBEN FRIEDMAN, Primary Examiner

F. A. SPEAR, Jr., Assistant Examiner

U.S. Cl. X.R.

210—321, 500